United States Patent
Li et al.

(10) Patent No.: US 12,071,681 B2
(45) Date of Patent: Aug. 27, 2024

(54) METHOD FOR SMELTING LOW-PHOSPHORUS HIGH-MANGANESE STEEL BASED ON REDUCTION DEPHOSPHORIZATION OF FERROMANGANESE

(71) Applicant: North China University of Science and Technology, Hebei (CN)

(72) Inventors: Tao Li, Hebei (CN); Wei Liu, Hebei (CN); Chen Chen, Hebei (CN); Fucheng Zhang, Hebei (CN); Min Tan, Hebei (CN); Shaopeng Gu, Hebei (CN); Lin Zhang, Hebei (CN); Qian Meng, Hebei (CN); Degang Wei, Hebei (CN); Yuhan Sun, Hebei (CN); Guangbei Zhu, Hebei (CN); Aihua Zhao, Hebei (CN)

(73) Assignee: North China University of Science and Technology, Hebei (CN)

( * ) Notice: Subject to any disclaimer, the term of this patent is extended or adjusted under 35 U.S.C. 154(b) by 0 days.

(21) Appl. No.: 18/495,134

(22) Filed: Oct. 26, 2023

(65) Prior Publication Data
US 2024/0141462 A1 May 2, 2024

(30) Foreign Application Priority Data
Oct. 28, 2022 (CN) .......................... 202211330606.2

(51) Int. Cl.
C22C 33/06 (2006.01)
C21C 7/00 (2006.01)
C21C 7/064 (2006.01)

(52) U.S. Cl.
CPC ............ *C22C 33/06* (2013.01); *C21C 7/0006* (2013.01); *C21C 7/0087* (2013.01); *C21C 7/0645* (2013.01)

(58) Field of Classification Search
CPC ....... C22C 33/06; C21C 7/0006; C21C 7/0087; C21C 7/0645
See application file for complete search history.

(56) References Cited

FOREIGN PATENT DOCUMENTS

| CN | 102766799 | 11/2012 |
|---|---|---|
| CN | 111850239 | 10/2020 |

(Continued)

OTHER PUBLICATIONS

Notification to Grant Patent Right for Invention from SIPO in application No. CN202211330606.2 dated May 29, 2023.

(Continued)

*Primary Examiner* — Alexandra M Moore
(74) *Attorney, Agent, or Firm* — Piloff Passino & Cosenza LLP; Rachel K. Piloff; Sean A. Passino

(57) ABSTRACT

A method for smelting low-phosphorus high-manganese steel based on reduction dephosphorization of ferromanganese is provided in the present application, relating to the technical field of high-manganese steel smelting, where the dephosphorization of ferromanganese is carried out under reducing atmosphere conditions through mediate-frequency induction furnace to obtain molten ferromanganese with lower phosphorus content, which is subsequently mixed with low phosphorus molten steel obtained by smelting in oxidative period of electric arc furnace in LF ladle refining furnace to make the Mn content of steel reach the requirement of high-manganese steel, and smelting is carried out under the condition of reducing atmosphere by adjusting the composition and temperature of the molten steel to meet the requirements of the target composition of the steel grade before tapping the steel.

4 Claims, 1 Drawing Sheet

(56) References Cited

FOREIGN PATENT DOCUMENTS

| | | |
|---|---|---|
| CN | 113493868 | 10/2021 |
| CN | 114393181 | 4/2022 |
| JP | H02267211 | 11/1990 |
| JP | 2000328124 | 11/2000 |

OTHER PUBLICATIONS

Retrieval report from SIPO in application No. CN202211330606.2 dated May 26, 2023.
Fan Pan, et al., "Study on smelting process of ultra-low phosphorus steel in 120t top-bottom combined blowing converter", Iron and Steel Research, No. 03, pp. 10-14, dated Jun. 10, 2012 (abstract translated).

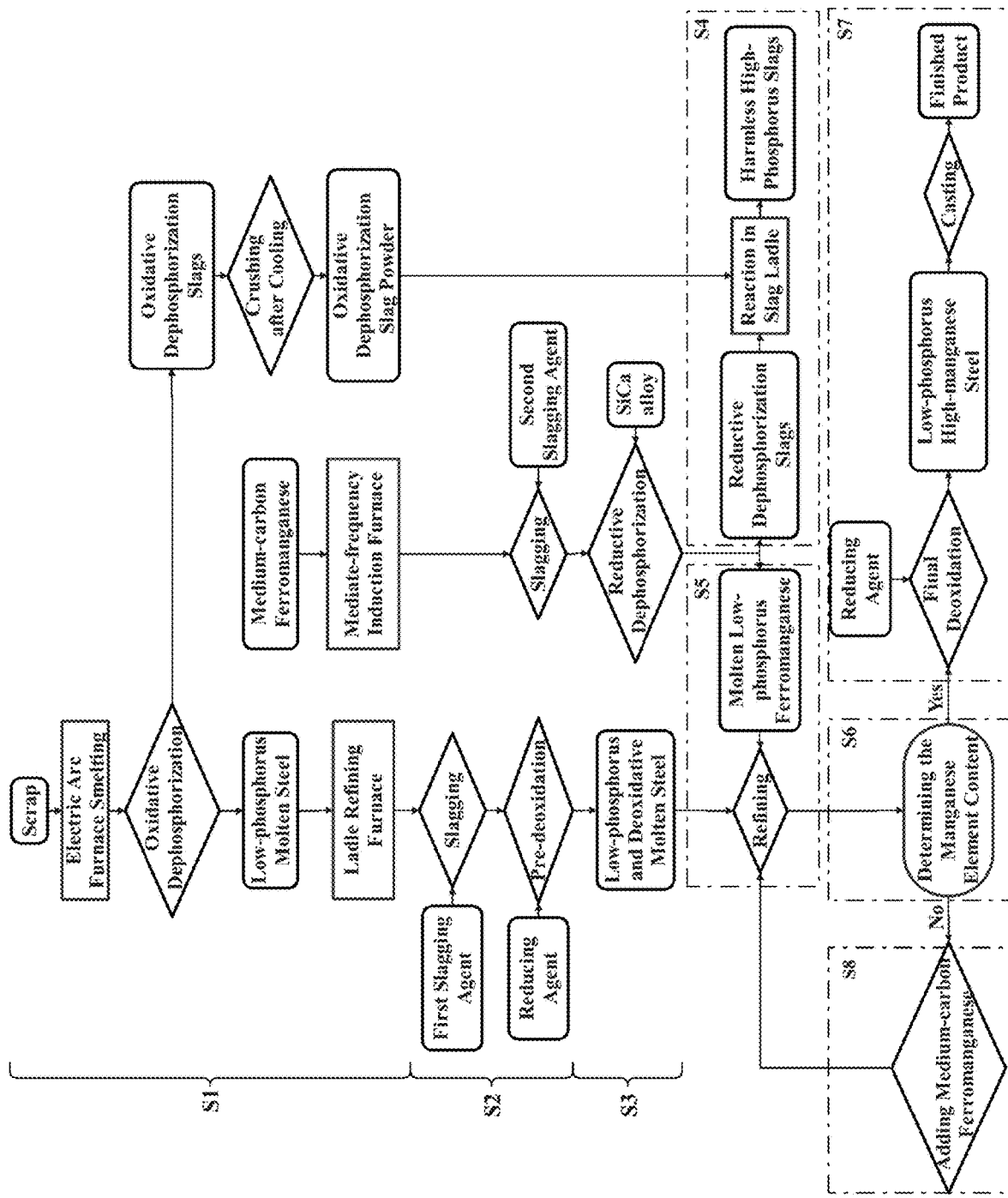

METHOD FOR SMELTING LOW-PHOSPHORUS HIGH-MANGANESE STEEL BASED ON REDUCTION DEPHOSPHORIZATION OF FERROMANGANESE

CROSS-REFERENCE TO RELATED APPLICATIONS

This application claims priority to Chinese Patent Application No. 202211330606.2, filed on Oct. 28, 2022, the contents of which are hereby incorporated by reference.

TECHNICAL FIELD

The present application belongs to the technical field of high-manganese steel smelting, and in particular to a method for smelting low-phosphorus high-manganese steel based on reduction dephosphorization of ferromanganese.

BACKGROUND

High-manganese steel is an alloy steel with manganese content above 10%, with features of strong impact resistance and wear resistance under high-pressure environments, making it an ideal material for the production of wear-resistant materials, and therefore has been widely used in mechanical equipment in metallurgy, mines, building materials, railway, electric power and coal, etc.

In recent years, higher demands have been placed on equipment performance with the rapid development of China's high-speed rail, mining and other industries, as the environment in which the equipment operates has deteriorated dramatically. The high-manganese steel prepared by conventional melting process has a disadvantage of high content of phosphorus (P), which will degrade the mechanical properties and casting performance of the high-manganese steel, reduce the toughness, plasticity and strength of the steel, and induce the occurrence of cold cracking and heat treatment cracking in the high-manganese steel. By reducing the P content, the appearance of cracks and premature failure of parts can be effectively prevented and the service life of the equipment can be improved. The high-manganese steel is one of the specialty steels and is often smelted using electric arc furnace, which combines both oxidative and reductive environments so as to achieve the functions of oxidative dephosphorization and reductive desulphurization of the electric arc furnace. In an oxidative environment of the electric arc furnace, P and other impurity elements are oxidized and removed to a lower level. In the smelting process of high-manganese steel, Mn element comes mainly from the ferromanganese alloy, where the Mn is more active than Fe and can only be added under the reductive atmosphere, i.e., in the reductive period of electric arc furnace smelting, so as to avoid a large amount of oxidative burning loss of Mn element. Since P cannot be removed during the reductive period, about 0.15% of the P element contained in the ferromanganese alloy will all enter the steel and cannot be removed. Therefore, reducing the P content in the molten steel before adding ferromanganese and reducing the P content in ferromanganese is an inevitable way to control the P content of the final product in the high-manganese steel production process.

Patent No. CN102409138A, entitled Process for Manufacturing Alloy Steel for Rail Frog, proposes that the carbon (C) content in steel is controlled to be above 0.50% during rudimentary smelting, the temperature is controlled to be above 1,560 degrees Celsius (° C.), and the oxygen blowing is carried out when the slag has good fluidity, so as to achieve the removal of P. The Chinese Patent No. CN113061798A, titled Smelting Technology of Alloyed High-manganese Steel, proposes that after the furnace charge is completely melted down, oxygen blowing is carried out at a temperature of over 1,560° C. for dephosphorization and decarburization. Both of the two methods of high-manganese steel smelting involve dephosphorization only in the melting and oxidative stages of the electric furnace smelting. However, the P content in steel at the end of the oxidative stage is at least 0.005% according to the current processing technology of electric arc furnace smelting, and the P content in steel increases after ferromanganese is added to steel during the reductive stage, thus the P content of the final product can no longer be reduced even though it complies with the requirements of the relevant product standards. Patent Publication No. CN112813351A, entitled High-manganese steel and Smelting Method Thereof, proposes to smelt high-manganese steel by using manganese metal with a content of over 95% as an alloy, where the P content in the manganese metal is relatively low; even though such a treatment method significantly reduces the P content of the final product, the cost of high-purity manganese metal is extremely high, resulting in a substantial increase in the final cost of the product, which is unfavorable for the long-term mass production and operation.

SUMMARY

In response to the above problems existing in the prior art, the present application addresses the technical problem of how to provide a method of smelting high-manganese steel at low costs and effectively reducing a phosphorus (P) content in the steel.

In order to solve the technical problems, the present application adopts the following technical schemes: a method for smelting low-phosphorus high-manganese steel based on reduction dephosphorization of ferromanganese, including the following steps:

S1, smelting high-manganese steel with scrap as a raw material by using an electric arc furnace, carrying out oxidative dephosphorization after the scrap is melted, removing oxidative dephosphorization slags after dephosphorization to obtain a low-phosphorus molten steel, crushing after cooling the oxidative dephosphorization slags obtained and putting into a slag ladle for later use, and transporting the low-phosphorus molten steel obtained via a ladle to an LF ladle refining furnace when a temperature is within a range of 1,460-1,580 degrees Celsius (° C.);

taking medium-carbon ferromanganese as a raw material, and taking 20% of a quality of scrap for electric arc furnace smelting of high manganese steel as an additive amount, heating up the medium-carbon ferromanganese to a molten state by using a mediate-frequency induction furnace, and holding the medium-carbon ferromanganese in the molten state at a temperature of 1,300° C.-1,400° C.;

S2, adding a first slagging agent to the LF ladle refining furnace to prepare reducing slags after the low-phosphorus molten steel arrives at the LF ladle refining furnace, then adding a reducing agent into the LF ladle refining furnace for pre-deoxidation to obtain a low-phosphorus and low-oxygen molten steel, where an amount of the first slagging agent is 1.5%-2.0% of a mass of the low-phosphorus molten steel, an amount of the reducing agent is 0.1%-0.2% of the mass of the low-phosphorus molten steel; the first slagging agent is a mixture of CaO, $CaF_2$, $SiO_2$, and $Al_2O_3$, and a mass ratio of each substance in the mixture is: CaO accounts for 55%-65%, $CaF_2$ accounts for 20%-30%, $SiO_2$ accounts for 5%-15% and $Al_2O_3$ accounts for 2%-10%;

adding a second slagging agent into the mediate-frequency induction furnace, where an amount of the second slagging agent is 1.5%-2.0% of a mass of the medium-carbon ferromanganese, the second slagging agent is a mixture of CaO, $CaF_2$, $SiO_2$ and $CaC_2$, and a mass ratio of each substance in the mixture is: CaO accounts for 60%-70%, $CaF_2$ accounts for 0%45%, $SiO_2$ accounts for 10%-20%, and $CaC_2$ accounts for 5%-15%;

S3, adding a SiCa alloy into the mediate-frequency induction furnace after forming covering slags in the mediate-frequency induction furnace, with an amount of the SiCa alloy being 0.5%-1.0% of the mass of medium-carbon ferromanganese, reacting for 10-20 minutes (min) for reductive dephosphorization;

S4, removing reductive dephosphorization slags in the mediate-frequency induction furnace to obtain a molten low-phosphorus ferromanganese after a reaction of the reductive dephosphorization in S3 is completed, holding the reductive dephosphorization slags at a temperature of 1,350° C.-1,450° C. and pouring into the slag ladle of S1 stored with the oxidative dephosphorization slags;

S5, adding the molten low-phosphorus ferromanganese obtained in S4 into the low-phosphorus and low-oxygen molten steel obtained after S2 treatment, holding the molten steel at a temperature of 1,460° C.-1,580° C., and continuing a reduction refining in the LF ladle refining furnace for 10-15 min;

S6, determining whether currently a manganese (Mn) element content in the molten steel meets composition requirements of steel grades, if satisfied, then carrying out S7, or carrying out S8 if the Mn element content is lower than the composition requirements of steel grades;

S7, holding the molten steel at the temperature of 1,460° C.-1,580° C., adding the reducing agent described in S2 for final deoxidation and tapping, where an amount of the reducing agent is 0.018%-0.022% of a mass of the molten steel;

S8, adding medium-carbon ferromanganese into a current molten steel, smelting for 3-7 min, and returning to S6, where an addition amount of the medium-carbon ferromanganese is determined by a following formula:

$$\text{addition amount of the medium} - \text{carbon ferromanganese} = \frac{(\text{Mn element proportion of a steel grade} - \text{Mn element proportion of a sample}) \times \text{mass of smelted high manganese steel}}{\text{Mn element proportion of medium} - \text{carbon ferromanganese}},$$

with a unit of kilogram (kg);

Optionally, the reducing agent in the S2 is ferrosilicon, or SiC, or silicomanganese alloy, or silicon calcium alloy, or aluminum alloy, with a Si content of 70%-80%.

Optionally, a C content in the medium-carbon ferromanganese in the S2 is 1.0%-2.5% of a total mass of the medium-carbon ferromanganese, and a Mn content is 75%-80% of the total mass of ferromanganese.

Optionally, mass proportions of effective components in the SiCa alloy in the S3 is: Si content of 50%-65%, and Ca content of 30%-35%.

Optionally, the composition requirements of steel grades in the S6 include: C accounts for 1.00%-1.20%, Si accounts for 0.40%-0.60%, Mn accounts for 10%-15%, P accounts for less than 0.030% and S accounts for less than 0.010%.

Compared with the prior art, the present application has at least the following advantages:

the method of the present application achieves substantial reduction of the P content in the finished high-manganese steel, improves the production efficiency, saves energy consumption, and achieves the resourceful utilization of phosphorus-containing slags at the same time; by melting ferromanganese in a mediate-frequency induction furnace and carrying out reduction and dephosphorization under strong reducing conditions, molten low-phosphorus ferromanganese is obtained and added to the molten steel as raw material of ferromanganese alloys in an LF ladle refining furnace, and the phosphorus content in the finished high-manganese steel molten steel obtained by the method of the present application is substantially reduced as compared with that of the existing process of adding undephosphated ferromanganese alloy to the electric arc furnace;

at the same time as melting the scrap in the electric arc furnace, the intermediate-frequency furnace is used at first to melt ferromanganese, which is then blended into the LF ladle refining furnace; such a process greatly shortens the smelting cycle, reduces the heat loss and saves electricity consumption to a certain extent compared with the existing process;

according to the present application, the oxidative dephosphorization slags of the electric arc furnace containing phosphorus and the reduced slags of the intermediate-frequency furnace containing phosphorus are mixed and treated, in which the oxidative dephosphorization slags are used to oxidize the phosphide in the reduced slags to obtain the slags with a higher P content, thus realizing the resourcing of solid waste and avoiding the pollution to the environment; and in the existing high-manganese steel, the P content is basically around 0.035%, which is reduced to around 0.018%-0.022% in the finished steel after adopting the method of the present application; at the same time, the room temperature solid ferromanganese is avoided to be added into the molten steel by pre-melting ferromanganese in the mediate-frequency induction furnace, and the temperature of the molten steel at the end of the oxidative period is properly lowered, thereby saving electric power and reducing the cost to a certain extent.

BRIEF DESCRIPTION OF THE DRAWING

The FIGURE shows a schematic process illustrating a method of the present application.

DETAILED DESCRIPTION OF THE EMBODIMENTS

The present application is illustrated in further detail below.

The present application provides a method for smelting low-phosphorus high-manganese steel based on reduction dephosphorization of ferromanganese, whereby ferromanganese is smelted in a mediate-frequency induction furnace to reduce the P content in ferromanganese to obtain low-phosphorus ferromanganese in a molten state, then the low-phosphorus ferromanganese is added into an LF ladle refining furnace to be mixed with low-phosphorus molten steel obtained by a oxidative smelting method of electric arc furnace to finally obtain a molten steel with low P content. In the present application, the production mode in the prior art that solid high-phosphorus ferromanganese of normal-temperature is directly added in the reductive period of the electric arc furnace is replaced, so that the P content in the final molten steel is greatly reduced; also, the oxidizability of the dephosphated slags oxidized by the electric arc furnace is utilized to oxidize the negative-valence phosphorus in the dephosphated slags reduced by the intermediate-frequency furnace into high-valence phosphorus, and the obtained phosphorus-containing slag can be used as raw materials for the production of phosphate fertilizer and other products; by adopting the method, the P content in high-manganese steel is effectively reduced, with improved production efficiency, reduced production cost in addition to improved performance of the high-manganese steel.

As shown in the FIGURE, the method for smelting low-phosphorus high-manganese steel based on reduction dephosphorization of ferromanganese includes the following steps:

S1, smelting high-manganese steel with scrap as raw material using an electric arc furnace, carrying out oxidative dephosphorization after the scrap is melted, removing oxidative dephosphorization slags after the oxidative dephosphorization to obtain a low-phosphorus molten steel, crushing after cooling the oxidative dephosphorization slags obtained and putting into a slag ladle for later use, and transporting the low-phosphorus molten steel obtained via a ladle to an LF ladle refining furnace when a temperature is within a range of 1,460-1,580 degrees Celsius (° C.), where a P content is 0.005% when tapping at an oxidative period of electric arc furnace smelting;

meanwhile, taking medium-carbon ferromanganese as a raw material, and taking 20% of a quality of scrap for electric arc furnace smelting of high manganese steel as an additive amount, heating up the medium-carbon ferromanganese to a molten state by using a mediate-frequency induction furnace, and holding the medium-carbon ferromanganese in the molten state at a temperature of 1,300° C.-1,400° C.;

S2, adding a first slagging agent to the LF ladle refining furnace to prepare reducing slag after the low-phosphorus molten steel arrives at the LF ladle refining furnace, then adding a reducing agent into the LF ladle refining furnace for pre-deoxidation to obtain a low-phosphorus and low-oxygen molten steel, where an amount of the first slagging agent is 1.5%-2.0% of a mass of the low-phosphorus molten steel, an amount of the reducing agent is 0.1%-0.2% of the mass of the low-phosphorus molten steel; the first slagging agent is a mixture of CaO, $CaF_2$, $SiO_2$, and $Al_2O_3$, and a mass ratio of each substance in the mixture is: CaO accounts for 55%-65%, $CaF_2$ accounts for 20%-30%, $SiO_2$ accounts for 5%-15% and $Al_2O_3$ accounts for 2%-10%;

adding a second slagging agent into the mediate-frequency induction furnace, where an amount of the second slagging agent is 1.5%-2.0% of a mass of the medium-carbon ferromanganese, the second slagging agent is a mixture of CaO, $CaF_2$, $SiO_2$ and $CaC_2$, and a mass ratio of each substance in the mixture is: CaO accounts for 60%-70%, $CaF_2$ accounts for 0%-15%, $SiO_2$ accounts for 10%-20%, and $CaC_2$ accounts for 5%-15%;

S3, adding a SiCa alloy into the mediate-frequency induction furnace after forming covering slags in the mediate-frequency induction furnace, with an amount of the SiCa alloy being 0.5%-1.0% of the mass of medium-carbon ferromanganese, allowing a strong reducing environment to form in the mediate-frequency induction furnace, reacting for 10-20 minutes (min) for reductive dephosphorization; under such conditions, a dephosphorization rate of the medium-carbon ferromanganese can reach 40%-60%;

S4, removing reductive dephosphorization slags in the mediate-frequency induction furnace to obtain a molten low-phosphorus ferromanganese after a reaction of the reductive dephosphorization in S3 is completed, holding the reductive dephosphorization slags at a temperature of 1,350° C.-1,450° C. and pouring into the slag ladle of S1 stored with the oxidative dephosphorization slags; oxidizing unstable phosphide with negative valence such as $Ca_3P_2$ in the oxidative dephosphorization slags using FeO, MnO and other oxides to produce P, $P_2O_3$, and $P_2O_5$, and so on, with the avoidance of phosphine gas generated by phosphide upon encountering water in a humid environment and environmental pollution, and the phosphorus-containing slag can be reused as phosphorus fertilizer resources after treatment;

S5, adding the molten low-phosphorus ferromanganese obtained in S4 into the molten steel obtained after S2 treatment, holding the molten steel at a temperature of 1,460° C.-1,580° C., and continuing a reduction refining in the LF ladle refining furnace for 10-15 min;

S6, determining whether currently a manganese (Mn) element content in the molten steel meets composition requirements of steel grades, if satisfied, then carrying out S7, or carrying out S8 if the Mn element content is lower than the composition requirements of steel grades;

the composition requirements of steel grades include: C accounts for 1.00%-1.20%, Si accounts for 0.40%-0.60%, Mn accounts for 10%-15%, P accounts for less than 0.030% and S accounts for less than 0.010%;

S7, holding the molten steel at the temperature of 1,460° C.-1,580° C., adding the reducing agent described in S2 for a final deoxidation and then tapping, where an amount of the reducing agent is 0.018%-0.022% of a mass of the molten steel; the final deoxidation refers to: stripping the oxygen elements within the molten steel to a low level using strong reducing agents such as calcium silicate alloys and aluminum rods, preventing problems such as tissue defects from occurring to degrade the properties of the steel after solidification;

S8, adding medium-carbon ferromanganese into a current molten steel, smelting for 5 min, and returning to S6, where an addition amount of the medium-carbon ferromanganese is determined by a following formula:

$$\text{addition amount of the medium} - \text{carbon ferromanganese} = \frac{\begin{array}{c}(\text{Mn element proportion of a steel grade} - \\ \text{Mn element proportion of a sample}) \times \\ \text{mass of smelted high manganese steel}\end{array}}{\text{Mn element proportion of medium} - \text{carbon ferromanganese}},$$

with a unit of kilogram (kg);

Embodiment 1

A method for smelting low-phosphorus high-manganese steel based on reduction dephosphorization of ferromanganese includes the following steps:

S1, smelting high-manganese steel with scrap as raw material using an electric arc furnace, carrying out oxidative dephosphorization after the scrap is melted, removing oxidative dephosphorization slags after the oxidative dephosphorization to obtain a low-phosphorus molten steel, crushing after cooling the oxidative dephosphorization slags obtained and putting into a slag ladle for later use, and transporting the low-phosphorus molten steel obtained via a ladle to an LF ladle refining furnace when a temperature is within a range of 1,460° C., where a P content is 0.005% when tapping at an oxidative period of electric arc furnace smelting;

meanwhile, taking medium-carbon ferromanganese as a raw material, and taking 20% of a quality of scrap for electric arc furnace smelting of high manganese steel as an additive amount, heating up the medium-carbon ferromanganese to a molten state by using a mediate-frequency induction furnace, and holding the medium-carbon ferromanganese in the molten state at a temperature of 1,300° C.;

S2, adding a first slagging agent to the LF ladle refining furnace to prepare reducing slag after the low-phosphorus molten steel arrives at the LF ladle refining furnace, then adding ferrosilicon into the LF ladle refining furnace for pre-deoxidation to obtain a low-phosphorus and low-oxygen molten steel, where the first slagging agent is dosed at 1.5% of a mass of the low-phosphorus molten steel, and the reducing agent is dosed at 0.1% of the mass of the low-phosphorus molten steel;

the first slagging agent is a mixture of CaO, $CaF_2$, $SiO_2$ and $Al_2O_3$ with proportions of 55%, 20%, 15% and 10%, respectively;

adding a second slagging agent into the mediate-frequency induction furnace, where the second slagging agent is dosed at 1.5% of a mass of the medium-carbon ferromanganese, the second slagging agent is a mixture of CaO, $CaF_2$, $SiO_2$ and $CaC_2$ with proportions of 70%, 15%, 10% and 5%, respectively;

S3, adding a SiCa alloy into the mediate-frequency induction furnace after forming covering slags in the mediate-frequency induction furnace, with an amount of the SiCa alloy being 0.50% of the mass of medium-carbon ferromanganese, allowing a strong reducing environment to form in the mediate-frequency induction furnace, reacting for 10 min for reductive dephosphorization; under such conditions, the dephosphorization rate of the medium-carbon ferromanganese can reach 40%-60%;

S4, removing reductive dephosphorization slags in the mediate-frequency induction furnace to obtain a molten low-phosphorus ferromanganese after a reaction of the reductive dephosphorization in S3 is completed, holding the reductive dephosphorization slags at a temperature of 1,350° C. and pouring into the slag ladle of S1 stored with the oxidative dephosphorization slags; oxidizing unstable phosphide with negative valence such as $Ca_3P_2$ in the oxidative dephosphorization slags using FeO, MnO and other oxides to produce P, $P_2O_3$, and $P_2O_5$, and so on, with the avoidance of phosphine gas generated by phosphide upon encountering water in a humid environment and environmental pollution, and the phosphorus-containing slag can be reused as phosphorus fertilizer resources after treatment;

S5, adding the molten low-phosphorus ferromanganese obtained in S4 into the molten steel obtained after S2 treatment, mixing thoroughly for refining and compositional fine-tuning, mixing thoroughly for refining and compositional fine-tuning to meet the composition requirements of steel grades, holding the molten steel at a temperature of 1,460° C., and continuing a reduction refining in the LF ladle refining furnace for 10 min;

S6, determining whether currently a Mn element content in the molten steel meets composition requirements of steel grades, if satisfied, then carrying out S7, or carrying out S8 if the Mn element content is lower than the composition requirements of steel grades;

S7, holding the molten steel at the temperature of 1,460° C., adding the SiCa alloy for a final deoxidation and then tapping, where the reducing agent is dosed in 0.018% of a mass of the molten steel;

S8, adding medium-carbon ferromanganese into a current molten steel, smelting for 3 min, and returning to S6, where an addition amount of the medium-carbon ferromanganese is determined by a following formula:

$$\text{addition amount of the medium} - \text{carbon ferromanganese} = \frac{\begin{pmatrix}\text{Mn element proportion of a steel grade} - \\ \text{Mn element proportion of a sample}\end{pmatrix} \times \text{mass of smelted high manganese steel}}{\text{Mn element proportion of medium} - \text{carbon ferromanganese}},$$

with a unit of kg.

Embodiments 2-10 adopt the same preparation method as that of Embodiment 1, the difference lies in the quantity ratio of the ingredients and the selection of process parameters, see Table 1 for details.

TABLE 1

Ingredient ratios and process parameters of Embodiments 2-10

| | S1 | | S2 | | | | S3 | |
|---|---|---|---|---|---|---|---|---|
| | Temperature of low-phosphorus molten steel | Temperature of medium-carbon ferromanganese | Amount of first reducing agent | Types of reducing agent | Amount of reducing agent | Amount of second reducing agent | SiCa alloy | Reacting duration |
| Embodiment 2 | 1,490° C. | 1,325° C. | 1.63% | SiC | 0.13% | 1.63% | 0.60% | 10.5 min |

TABLE 1-continued

Ingredient ratios and process parameters of Embodiments 2-10

| Embodiment 3 | 1,520° C. | 1,350° C. | 1.75% | Silico-manganese alloy | 0.15% | 1.75% | 0.70% | 12.0 min |
|---|---|---|---|---|---|---|---|---|
| Embodiment 4 | 1,550° C. | 1,375° C. | 1.88% | Calcium-silicon alloy | 0.18% | 1.88% | 0.80% | 13.5 min |
| Embodiment 5 | 1,580° C. | 1,400° C. | 2.00% | Aluminium alloy | 0.20% | 2.00% | 0.90% | 15.0 min |
| Embodiment 6 | 1,460° C. | 1,300° C. | 1.50% | SiC | 0.10% | 1.50% | 1.00% | 16.0 min |
| Embodiment 7 | 1,490° C. | 1,325° C. | 1.63% | Silico-manganese alloy | 0.13% | 1.63% | 0.50% | 16.5 min |
| Embodiment 8 | 1,520° C. | 1,350° C. | 1.75% | Calcium-silicon alloy | 0.15% | 1.75% | 0.60% | 18.0 min |
| Embodiment 9 | 1,550° C. | 1,375° C. | 1.88% | Aluminum alloy | 0.18% | 1.88% | 0.70% | 19.5 min |
| Embodiment 10 | 1,580° C. | 1,400° C. | 2.00% | Silico-manganese alloy | 0.20% | 2.00% | 0.80% | 20.0 min |

|  | S4 | S5 | | S7 | | | S8 |
|---|---|---|---|---|---|---|---|
|  | Temperature of reductive dephosphorization slag | Temperature of molten steel | Reacting duration | Temperature of molten steel | Types of deoxidizer | Amount of deoxidizer | Reacting duration |
| Embodiment 2 | 1,375° C. | 1,580° C. | 11.25 min | 1,580° C. | Aluminium alloy | 0.02% | 4 min |
| Embodiment 3 | 1,400° C. | 1,550° C. | 12.50 min | 1,550° C. | Calcium-silicon alloy | 0.02% | 5 min |
| Embodiment 4 | 1,425° C. | 1,520° C. | 13.75 min | 1,520° C. | Aluminium alloy | 0.02% | 6 min |
| Embodiment 5 | 1,450° C. | 1,490° C. | 15.00 min | 1,490° C. | Aluminium alloy | 0.02% | 7 min |
| Embodiment 6 | 1,300° C. | 1,460° C. | 10.00 min | 1460° C. | Calcium-silicon alloy | 0.02% | 3 min |
| Embodiment 7 | 1,375° C. | 1,580° C. | 11.25 min | 1,580° C. | Aluminium alloy | 0.02% | 4 min |
| Embodiment 8 | 1,400° C. | 1,550° C. | 12.50 min | 1,550° C. | Aluminium alloy | 0.02% | 5 mir |
| Embodiment 9 | 1,425° C. | 1,520° C. | 13.75 min | 1,520° C. | Calcium-silicon alloy | 0.02% | 6 min |
| Embodiment 10 | 1,450° C. | 1,490° C. | 15.00 min | 1,490° C. | Aluminium alloy | 0.02% | 7 min |

Table 2 shows the mass ratio of each component of the first slagging agent and the second slagging agent in Embodiments 2-10.

TABLE 2

|  | Components of the first slagging agent | Components of the second slagging agent |
|---|---|---|
| Embodiment 2 | 57.5% CaO, 22.5% CaF$_2$, 12.5% SiO$_2$, 7.5% Al$_2$O$_3$ | 60% CaO, 5% CaF$_2$, 20% SiO$_2$, 15% CaC$_2$ |
| Embodiment 3 | 60.0% CaO, 25.0% CaF$_2$, 10.5% SiO$_2$, 7.5% Al$_2$O$_3$ | 62% CaO, 5% CaF$_2$, 18% SiO$_2$, 15% CaC$_2$ |
| Embodiment 4 | 62.5% CaO, 27.5% CaF$_2$, 7.5% SiO$_2$, 4.5% Al$_2$O$_3$ | 64% CaO, 5% CaF$_2$, 16% SiO$_2$, 15% CaC$_2$ |
| Embodiment 5 | 65% CaO, 28.0% CaF$_2$, 5% SiO$_2$, 2% Al$_2$O$_3$ | 66% CaO, 0% CaF$_2$, 19% SiO$_2$, 15% CaC$_2$ |
| Embodiment 6 | 55% CaO, 20.0% CaF$_2$, 15% SiO$_2$, 10.0% Al$_2$O$_3$ | 65% CaO, 10% CaF$_2$, 10% SiO$_2$, 15% CaC$_2$ |
| Embodiment 7 | 57.5% CaO, 22.5% CaF$_2$, 12.5% SiO$_2$, 7.5% Al$_2$O$_3$ | 68% CaO, 10% CaF$_2$, 12% SiO$_2$, 10% CaC$_2$ |

TABLE 2-continued

|  | Components of the first slagging agent | Components of the second slagging agent |
|---|---|---|
| Embodiment 8 | 60.0% CaO, 25% CaF$_2$, 10.0% SiO$_2$, 4.5% Al$_2$O$_3$ | 70% CaO, 10% CaF$_2$, 15% SiO$_2$, 5% CaC$_2$ |
| Embodiment 9 | 62.5% CaO, 27.5% CaF$_2$, 7.5% SiO$_2$, 2.5% Al$_2$O$_3$ | 65% CaO, 0% CaF$_2$, 20% SiO$_2$, 15% CaC$_2$ |
| Embodiment 10 | 65% CaO, 28.0% CaF$_2$, 5% SiO$_2$, 2% Al$_2$O$_3$ | 65% CaO, 0% CaF$_2$, 20% SiO$_2$, 15% CaC$_2$ |

Table 3 shows the phosphorus content of the low-phosphorus high-manganese steel smelted based on reduction dephosphorization of ferromanganese prepared in Embodiments 1-10.

TABLE 3

|  | P content of finished steel |
|---|---|
| Embodiment 1 | 0.028% |
| Embodiment 2 | 0.026% |
| Embodiment 3 | 0.022% |
| Embodiment 4 | 0.027% |
| Embodiment 5 | 0.025% |
| Embodiment 6 | 0.020% |
| Embodiment 7 | 0.026% |
| Embodiment 8 | 0.022% |
| Embodiment 9 | 0.019% |
| Embodiment 10 | 0.021% |

As can be seen from Table 3: the data in Table 3 is the phosphorus content in the finished steel obtained by each embodiment, and the lower the phosphorus content in the finished steel, the more ferromanganese dephosphorization is required.

Finally, the above embodiments serve only to illustrate the technical schemes of the present application and are not intended to be limiting, and although the present application has been described in detail with reference to the preferred embodiments, a person of ordinary skill in the art should understand that modifications or equivalent replacements can be made to the technical schemes of the present application without departing from the purpose and scope of the technical schemes of the present application, which should be covered by the scope of the claims of the present application.

What is claimed is:

1. A method for smelting high-manganese steel based on reduction dephosphorization of ferromanganese, comprising following steps:
   S1, smelting high-manganese steel with scrap as a raw material by using an electric arc furnace, carrying out oxidative dephosphorization after the scrap is melted, removing oxidative dephosphorization slags after dephosphorization to obtain a molten steel I, crushing after cooling the oxidative dephosphorization slags obtained and putting into a slag ladle for later use, and transporting the molten steel I obtained via a ladle to an LF ladle refining furnace when a temperature is within a range of 1,460-1,580 degrees Celsius;
   taking medium-carbon ferromanganese as a raw material, and taking 20% of a mass of scrap for electric arc furnace smelting of high manganese steel as an additive amount, heating up the medium-carbon ferromanganese to a molten state by using a mediate-frequency induction furnace, and holding the medium-carbon ferromanganese in the molten state at a temperature of 1,300° C.-1,400 degrees Celsius; wherein a C content in the medium-carbon ferromanganese is 1.0%-2.5% of a total mass of ferromanganese;
   S2, adding a first slagging agent to the LF ladle refining furnace to prepare reducing slag after the molten steel I arrives at the LF ladle refining furnace, then adding a reducing agent into the LF ladle refining furnace for pre-deoxidation to obtain a molten steel II, wherein an amount of the first slagging agent is 1.5%-2.0% of a mass of the molten steel I, an amount of the reducing agent is 0.1%-0.2% of the mass of the molten steel I; the first slagging agent is a mixture of CaO, CaF$_2$, SiO$_2$, and Al$_2$O$_3$, and a mass ratio of each substance in the mixture is: CaO accounts for 55%-65%, CaF$_2$ accounts for 20%-30%, SiO$_2$ accounts for 5%-15% and Al$_2$O$_3$ accounts for 2%-10%;
   adding a second slagging agent into the mediate-frequency induction furnace, wherein an amount of the second slagging agent is 1.5%-2.0% of a mass of the medium-carbon ferromanganese, the second slagging agent is a mixture of CaO, CaF$_2$, SiO$_2$ and CaC$_2$, and a mass ratio of each substance in the mixture is: CaO accounts for 60%-70%, CaF$_2$ accounts for 0%-15%, SiO$_2$ accounts for 10%-20%, and CaC$_2$ accounts for 5%-15%;
   S3, adding a SiCa alloy into the mediate-frequency induction furnace after forming covering slags in the mediate-frequency induction furnace, with an amount of the SiCa alloy being 0.5%-1.0% of the mass of medium-carbon ferromanganese, reacting for 10-20 minutes for reductive dephosphorization;
   S4, removing reductive dephosphorization slags in the mediate-frequency induction furnace to obtain a molten ferromanganese after a reaction of the reductive dephosphorization in the S3 is completed, holding the reductive dephosphorization slags at a temperature of 1,350-1,450 degree Celsius and pouring into the slag ladle of the S1 stored with the oxidative dephosphorization slags;
   S5, adding the molten ferromanganese obtained in the S4 into the molten steel II obtained after S2 treatment, holding the molten steel at a temperature of 1,460-1,580 degree Celsius, and continuing a reduction refining in the LF ladle refining furnace for 10-15 minutes;
   S6, determining currently a Mn element content in the molten steel, if the Mn element content is lower than the composition requirements of steel grades, adding medium-carbon ferromanganese into a current molten steel and smelting for 3-7 minutes until the Mn element content meets composition requirements of steel grades, then carrying out S7, wherein an addition amount of the medium-carbon ferromanganese is determined by a following formula:

addition amount of the ferromanganese =

$$\frac{\begin{pmatrix} \text{Mn element proportion of a steel grade} - \\ \text{Mn element proportion of a sample} \end{pmatrix} \times}{\text{Mn element proportion of medium} - \text{carbon ferromanganese}},$$

with a unit of kg;

if the Mn element content meets composition requirements of steel grades, then carrying out S7 directly, the composition requirements of steel grades are: C accounts for 1.00%-1.20%, Si accounts for 0.40%-0.60%, Mn accounts for 10%-15%, P accounts for less than 0.030% and S accounts for less than 0.010%; and S7, holding the molten steel at the temperature of 1,460° C.-1,580° C., adding the reducing agent described in the S2 for final deoxidation and tapping, with an amount of the reducing agent being 0.018%-0.022% of a mass of the molten steel.

2. The method for smelting high-manganese steel based on reduction dephosphorization of ferromanganese according to claim 1, wherein the reducing agent in the S2 is ferrosilicon, or SiC, or silicomanganese alloy, or silicon calcium alloy, or aluminum alloy, with a Si content of 70%-80%.

3. The method for smelting high-manganese steel based on reduction dephosphorization of ferromanganese according to claim 1, a Mn content in the medium-carbon ferromanganese in the S2 is 75%-80% of the total mass of ferromanganese.

4. The method for smelting high-manganese steel based on reduction dephosphorization of ferromanganese according to claim 1, wherein mass proportions of effective components in the SiCa alloy in the S3 are: 50%-65% of Si content, and 30%-35% of Ca content.

\* \* \* \* \*